United States Patent [19]

Ohlberg

[11] 4,039,229

[45] Aug. 2, 1977

[54] ROLLER BEARING CONSTRUCTION

[75] Inventor: Karlheinz Ohlberg, Oberhausen, Germany

[73] Assignee: Gutehoffnungshutte Sterkrade Aktiengesellschaft, Germany

[21] Appl. No.: 711,646

[22] Filed: Aug. 4, 1976

[30] Foreign Application Priority Data

Aug. 6, 1975 Germany .......................... 7524907

[51] Int. Cl.² ........................................... F16C 33/78
[52] U.S. Cl. ................................................. 308/187.1
[58] Field of Search .................. 308/187.1, 187, 187.2, 308/202

[56] References Cited

U.S. PATENT DOCUMENTS

| 2,818,302 | 12/1957 | Black | 308/187.1 X |
| 3,893,690 | 7/1975 | Yapp | 308/187.1 X |

Primary Examiner—Joseph F. Peters, Jr.
Assistant Examiner—Gene A. Church
Attorney, Agent, or Firm—McGlew and Tuttle

[57] ABSTRACT

A housing for friction and antifriction bearings comprises a cavity defined in the bearing housing between roller bearing 6 which has at least one bounding wall which is elastic and exposed on one side to the internal pressure of a lubricating chamber and on its opposite side to the exterior of the housing.

7 Claims, 2 Drawing Figures

ROLLER BEARING CONSTRUCTION

BACKGROUND OF THE INVENTION

1. Field Of The Invention

This invention relates in general to the construction of bearing housings and in particular to a new and useful bearing housing which includes an interior cavity for receiving a lubricant and which has a resilient bounding wall which is exposed on one side of the lubricant and on the opposite side of the exterior of the housing.

2. Description Of The Prior Art

In a construction of bearing housings for friction and antifriction bearings there is usually a lubricating cavity which is filled completely or partly with grease oir oil. Such bearing housings in the broadest sense of the term include those which accommodate two bearings or running wheels or races which are spaced from each other at a great distance and which include two inner bearing portions. In bearing housings which are exposed to high temperatures particularly for running wheels of grate cars for sintering machines it is not unusual for the content of the cavity to expand greatly due to the strong increases of temperature and the resultant thermal expansion. With the known constructions, such an increase of volume of the contents is prevented and excess pressure is produced at the interior of the housing. In practice however the bearing seals seldom withstand this internal pressure so that either air or grease is expelled depending on what is present at the leak. With a decreasing volume an underpressure is produced due to the closed lubricating chamber construction by which air or grease which has become dirtied by the surrounding atmosphere is sucked back into the cavity. Beacause of the so-called pumping action dirt from the outside passes continuously into the interior of the bearing housing.

SUMMARY OF THE INVENTION

The present invention provides a bearing housing for antifriction or plain bearings in which the volume of the inner space is permitted to vary in accordance with the volumetric expansion or diminution. Such a construction is obtained in accordance with the invention by providing at least one wall of the cavity which is an elastic wall and exposed on at least one of its sides to the exterior pressure of the atmosphere. Due to this construction the content of the housing cavity can expand or contract in almost a pressureless manner without expelling or taking in air or grease.

Accordingly it is an object of the invention to provide a housing for friction and antifriction bearings which comprises a housing with an interior cavity defining a lubricating chamber having a resilient wall bounding at least one side of the cavity and which is exposed on its opposite side to the outside pressure.

A further object of the invention is to provide a bearing housing construction which is simple in design, rugged in construction and economical to manufacture.

The various features of novelty which characterize the invention are pointed out with particularity in the claims annexed to and forming a part of the disclosure. For a better understanding of the invention, its operating advantages and specific objects attained by its uses, reference should be had to the accompanying drawing and descriptive matter in which there are illustrated preferred embodiments of the invention.

GENERAL DESCRIPTION OF THE PREFERRED EMBODIMENTS

Figure 1:
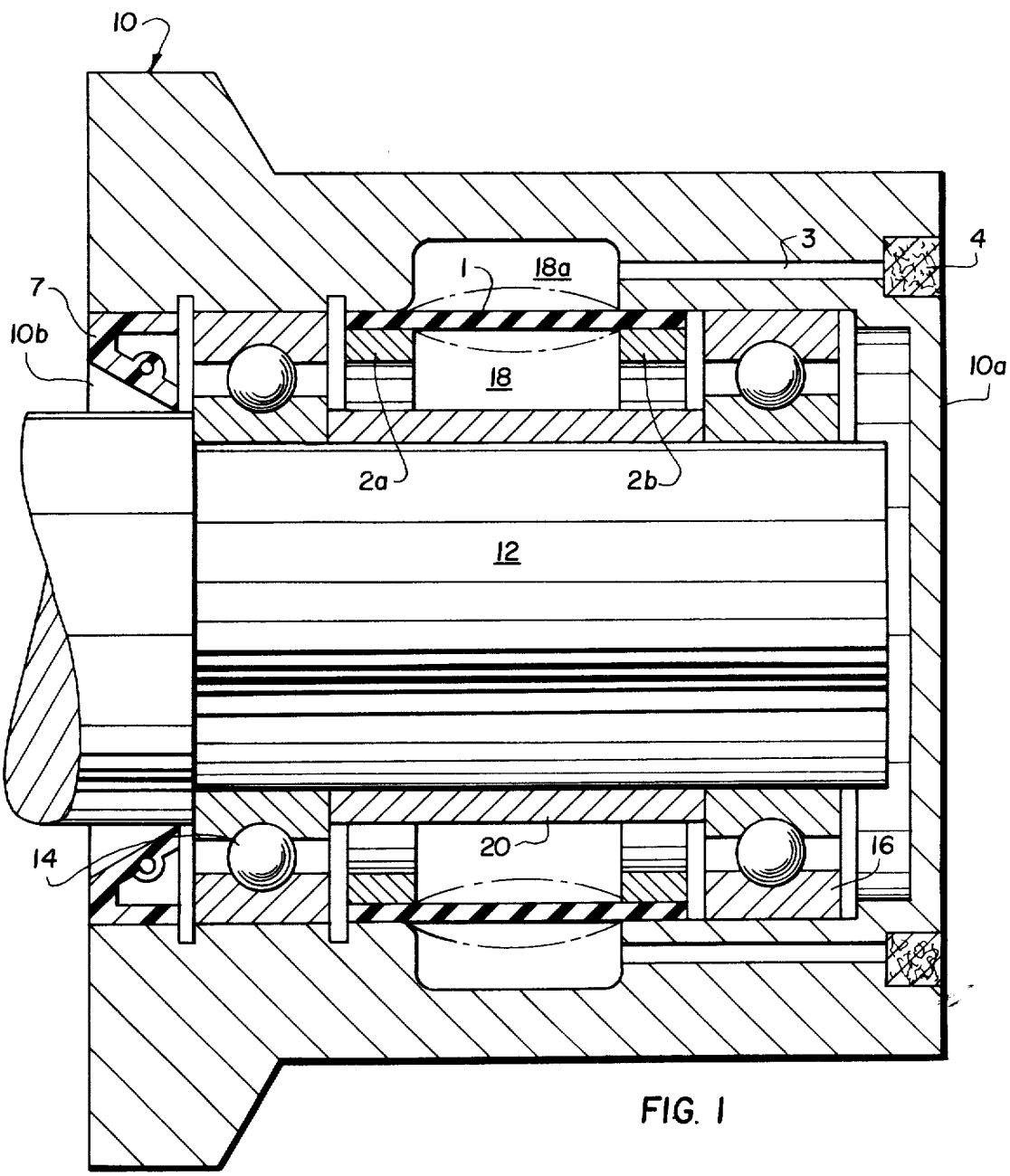
FIG. 1 is an axial sectional view through a bearing housing constructed in accordance with the invention.

Referring to the drawings in particular the invention embodied therein comprises in FIG. 1 a housing generally designated 10 which comprises a cylindrical member having a closed end 10a and an opened end 10b for receiving an end 12 of a shaft to be supported therein. The housing contains first and second roller bearing race assemblies 14 and 16 which engage the shaft portion 12 at spaced axial locations. The interior of the housing 10 includes a lubricating cavity 18 which is bounded at the inner side by a sleeve 20 which fits over the shaft 12 and it includes at least one bounding wall 1 which is made of an elastic material such as a rubber tube. The cavity contains grease and air and the rubber tube 1 is mounted by spaced split snap rings 2a and 2b which expand and firmly hold the resilient rubber tube 1 against the interior wall of the housing 10.

In accordance with the invention at least one side of the elastic bounding wall 1 is exposed to the atmosphere or the outside pressure and in the embodiment of FIG. 1 this is effected by communicating a cavity portion 18a which is located on one side of the elastic member 1 through a bore 3 which leads to the atmosphere. Preferably a filter 4 is positioned at the entrance to the bore 3 to insure that only clean air passes through the passage.

Thus with the invention even though the cavity 18 is filled with grease and air any variation of temperature to increase or decrease the volume of the materials will be accommodated by flexing of the rubber tube 1 without permitting the grease or air to escape or to be taken in through packing 7 which is arranged between the race assembly 14 and the outside end 10b of the housing 10.

Figure 2:
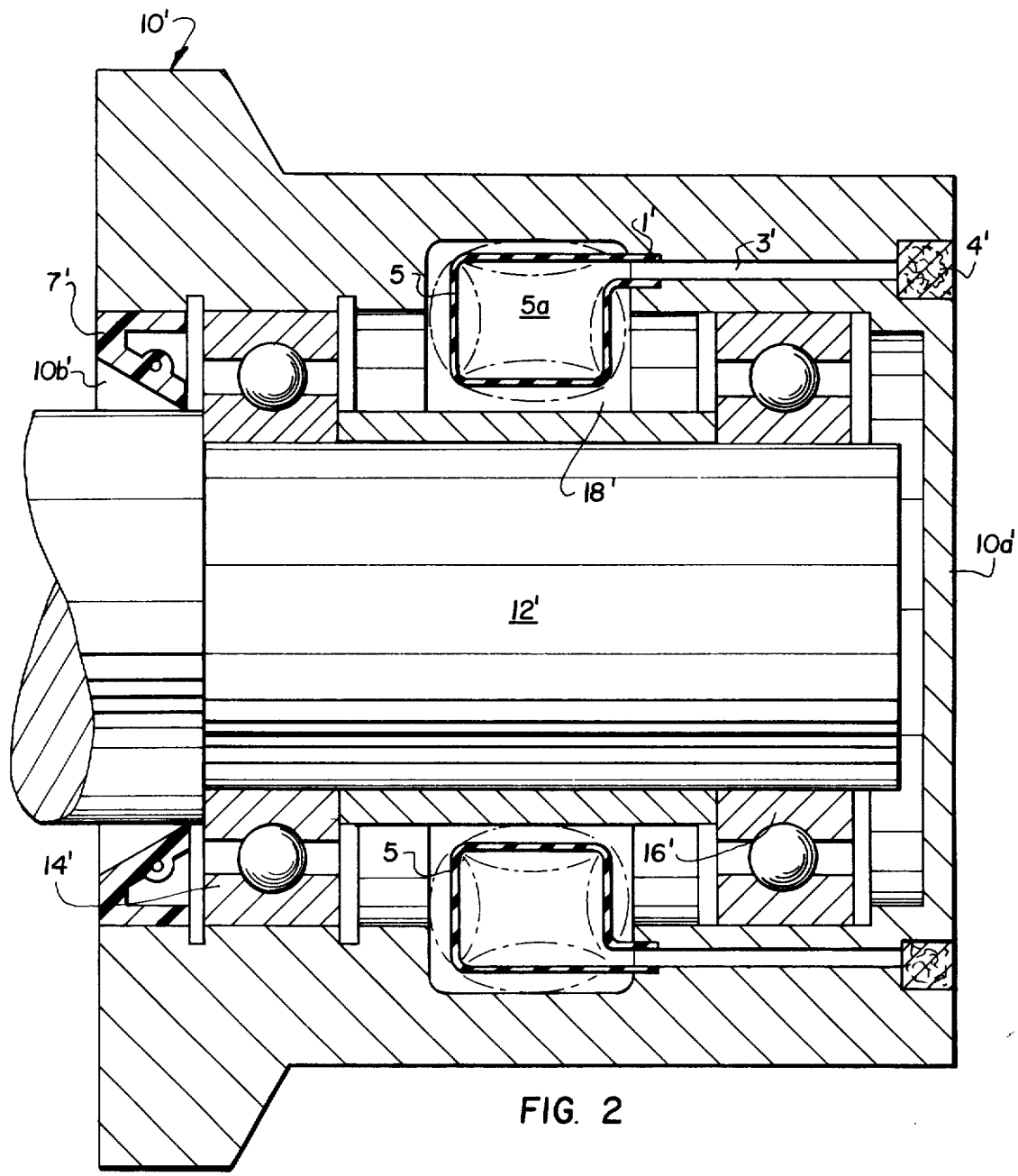
FIG. 2 is a view similar to FIG. 1 of another embodiment of the invention.

In the embodiment of FIG. 2 similar parts are similarly designated but with a prime added. In this embodiment the lubricating cavity 18' is not divided by a resilient member 1 but instead it carries an elastic tubular member 5 which has in respect to the other embodiment at least one wall which expands and contracts to accommodate for any changes in the volume of the lubricating material contained on the interior 5a thereof. Since the interior 5a communicates through a bore 3' and a filter 4' to the outside this construction also includes at least one surface of the resilient member namely the elastic tube 5 which is exposed to the outside pressure. In the event of any temperature changes the pressure within the lubricating chamber 5a is equalized as in the other embodiment through the bore 3' and the filter 4'. This makes it possible to increase or reduce the interior space of the bearing housing in accordance with volumetric variations. In the construction of FIG. 2 the elastic tube 5' has a nipple 1' which fits into an accommodation of the housing to communicate only with the bore 3'.

While specific embodiments of the invention have been shown and described in detail to illustrate the application of the principles of the invention, it will be understood that the invention may be embodied otherwise without departing from such principles.

What is claimed is:

1. A housing for friction and antifriction bearings, comprising wall means defining a lubrication cavity in said housing, at least one impermeable elastic wall extending over said lubrication cavity and having an exterior wall side, and vent means connected into said housing to said exterior wall side to expose said exterior wall side to outside pressure so as to permit flexing of said impermeable elastic wall by changes of pressure in said lubrication cavity.

2. A housing, according to claim 1, wherein said wall means defining said lubrication cavity defines an annular cavity, said impermeable elastic wall comprising an annular elastic tube extending across said annular cavity, said housing having a bore communicating with the cavity on one side of said elastic tube and comprising said vent means.

3. A housing according to claim 1, wherein said at least one wall comprises an elastic tubular member defining within the tubular member said lubricating cavity and a passage in said housing communicating the interior of said tubular member to the exterior of said housing comprising said vent means.

4. A roller bearing construction for the support of a rotatable shaft, comprising a roller bearing housing having at least one open end into which the shaft is adapted to extend, first and second roller bearing assemblies mounted in said housing at axially spaced locations and adapted to engage around the periphery of the shaft at axially spaced locations, said housing defining a lubrication cavity between said first and second roller bearings, a resilient member secured in said housing and having one side of at least one expansible and contractible surface bounding the lubrication cavity and having an opposite side, and passage means defining an outlet in said housing from the opposite side of said resilient member to the exterior of said housing.

5. A roller bearing construction according to claim 4, wherein said resilient member extends across the cavity and defines on one of its sides a bounding wall for the lubrication cavity and on the opposite side a space communicating with the exterior of the housing.

6. A roller bearing assembly according to claim 4, wherein said resilient member includes an elastic tube arranged within the lubrication cavity and defining on its interior the lubrication chamber and having a connection through said housing to the exterior thereof so that the interior wall of said tubular member is exposed to the exterior pressure.

7. A roller bearing construction according to claim 4, including a sleeve extending around said shaft between said roller bearings bounding one side of said cavity, said resilient member comprising an annular tube spaced radially outwardly from said sleeve and defining the opposite side of said cavity and first and second spaced apart split rings engaged with the resilient tube and bearing radially outwardly against the inner wall of the housing to hold said tube in position, the opposite side of said tube being connected through a bore through said housing to the exterior of said housing, and a filter disposed in the bore.

* * * * *